United States Patent [19]

Corominas

[11] Patent Number: 4,791,705
[45] Date of Patent: Dec. 20, 1988

[54] MACHINE FOR MEAT TREATMENT AND MACERATION, WITH AUTOMATIC LOADING AND UNLOADING

[75] Inventor: Narciso L. Corominas, Besalu, Spain

[73] Assignee: Metalquimia, S.A., Gerona, Spain

[21] Appl. No.: 52,422

[22] Filed: May 21, 1987

[30] Foreign Application Priority Data

May 22, 1986 [ES] Spain ................................. 555230

[51] Int. Cl.$^4$ .............................................. A22C 9/00
[52] U.S. Cl. ...................................... 17/25; 100/910; 99/472
[58] Field of Search ............... 17/25; 100/910; 99/472

[56] References Cited

U.S. PATENT DOCUMENTS 4,441,231  4/1984  Baccetti .................................. 17/25

FOREIGN PATENT DOCUMENTS 0127608  12/1984  European Pat. Off. ................. 17/25
1052235   3/1986  Japan ...................................... 17/25
1232905   5/1971  United Kingdom ..................... 17/25

Primary Examiner—Willie G. Abercrombie
Attorney, Agent, or Firm—Holman & Stern

[57] ABSTRACT

Machine for meat treatment and maceration, with automatic loading and unloading including a rotating drum having a loading and unloading hood inlet coaxial with the axis of rotation in one end, a door with fitting and locking devices for closing the drum hood inlet, driving and rolling support elements for driving and supporting the drum on a tilting frame for lifting and lowering one end of the drum articulated at the other end on a fixed structure, a series of containers surrounding the drum carried by a carriage structure for step-by-step advance movement, and a device for dumping a load in each container into a hopper for loading the drum, tilting of the frame by lifting the rear end of the drum producing unloading of the treated meat through the hood inlet into the container.

7 Claims, 10 Drawing Sheets

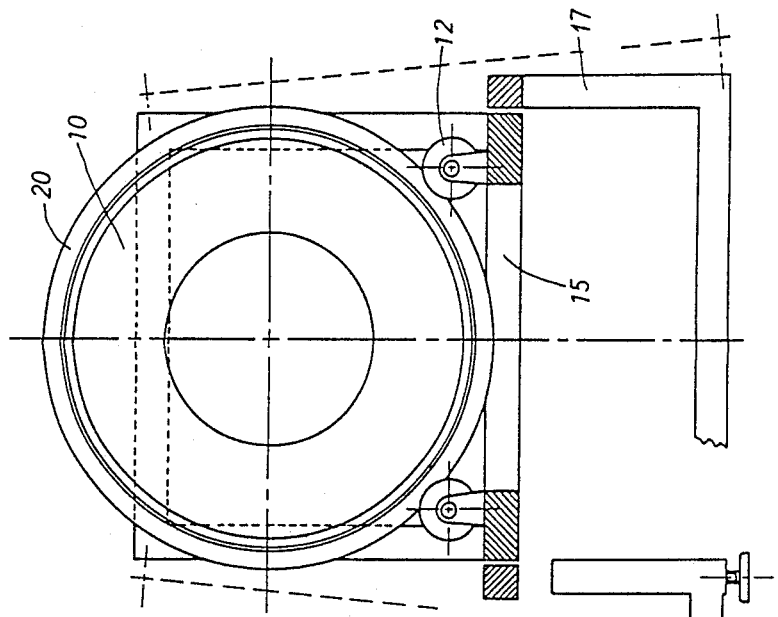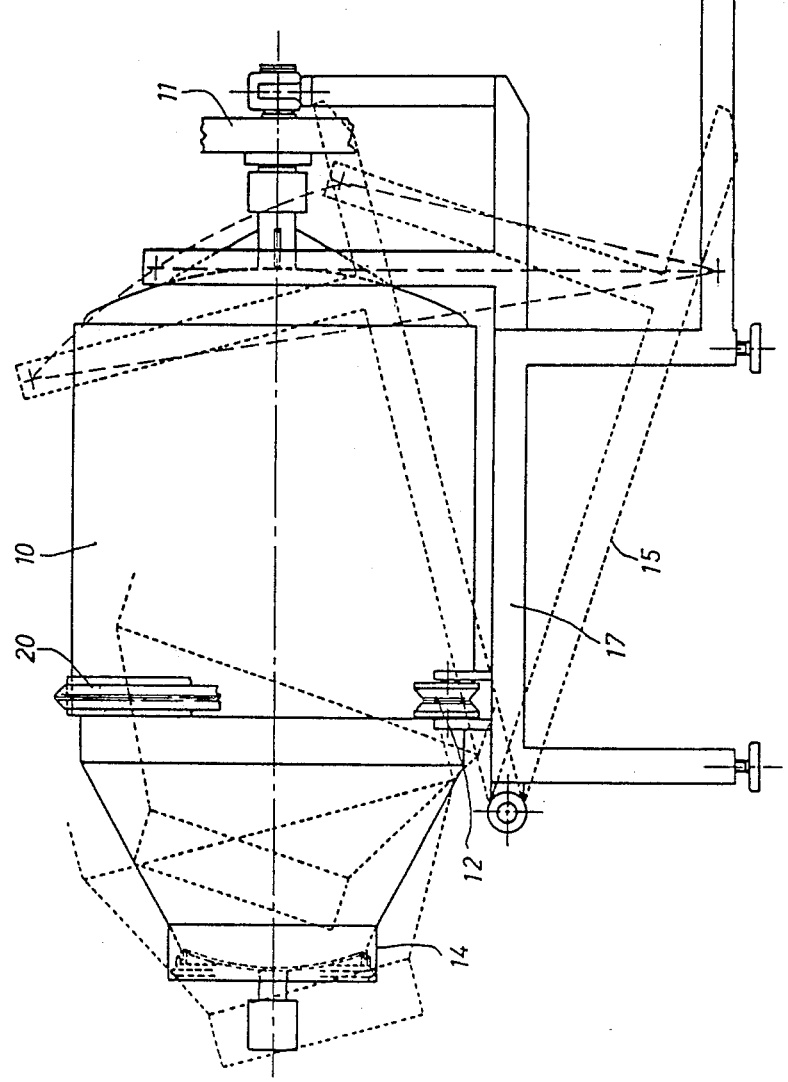

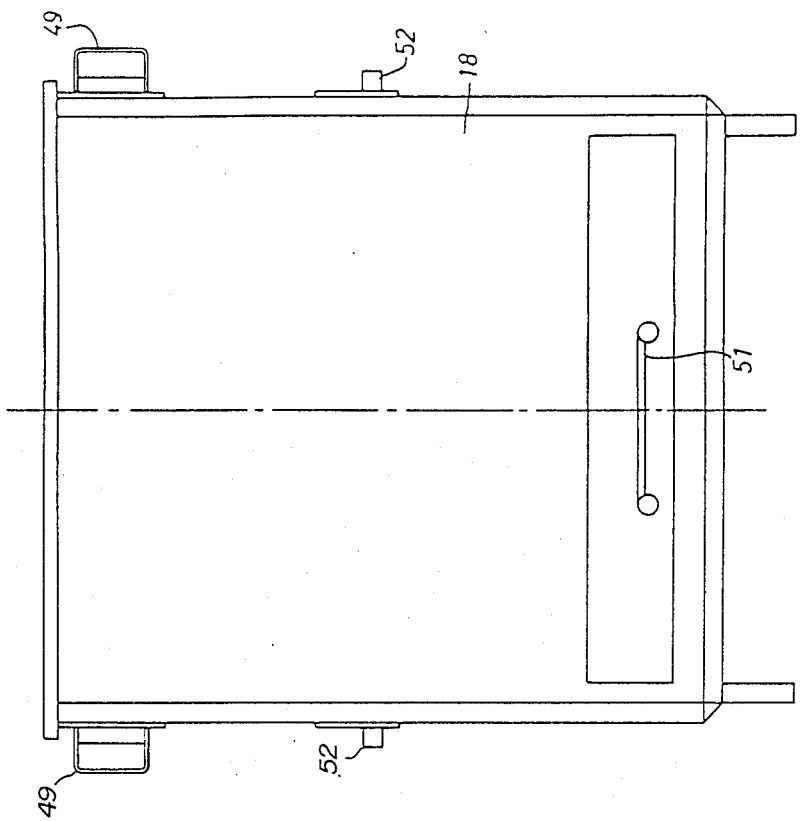
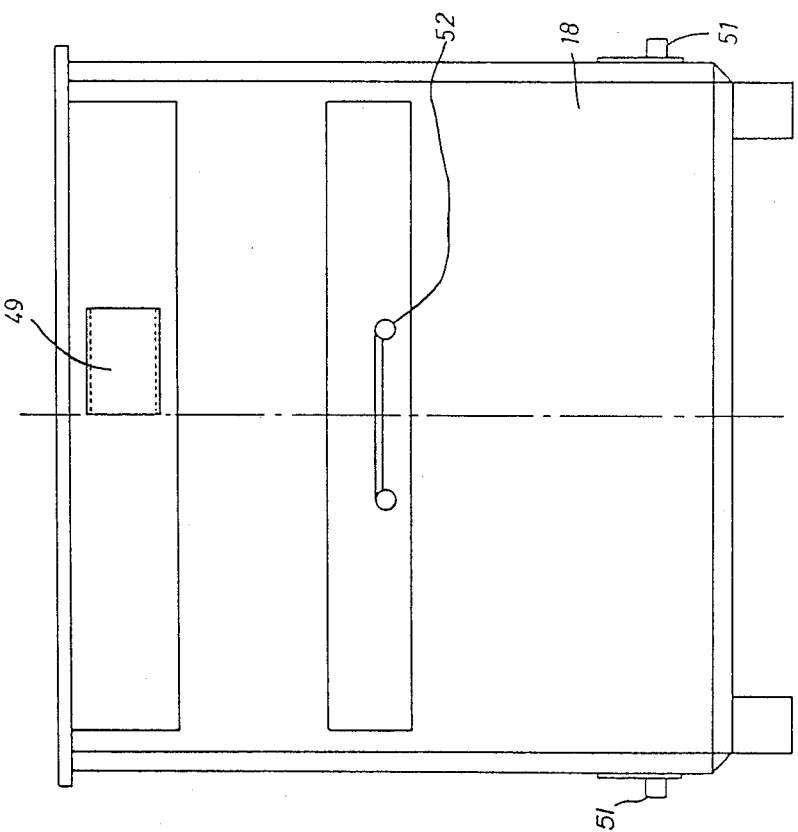

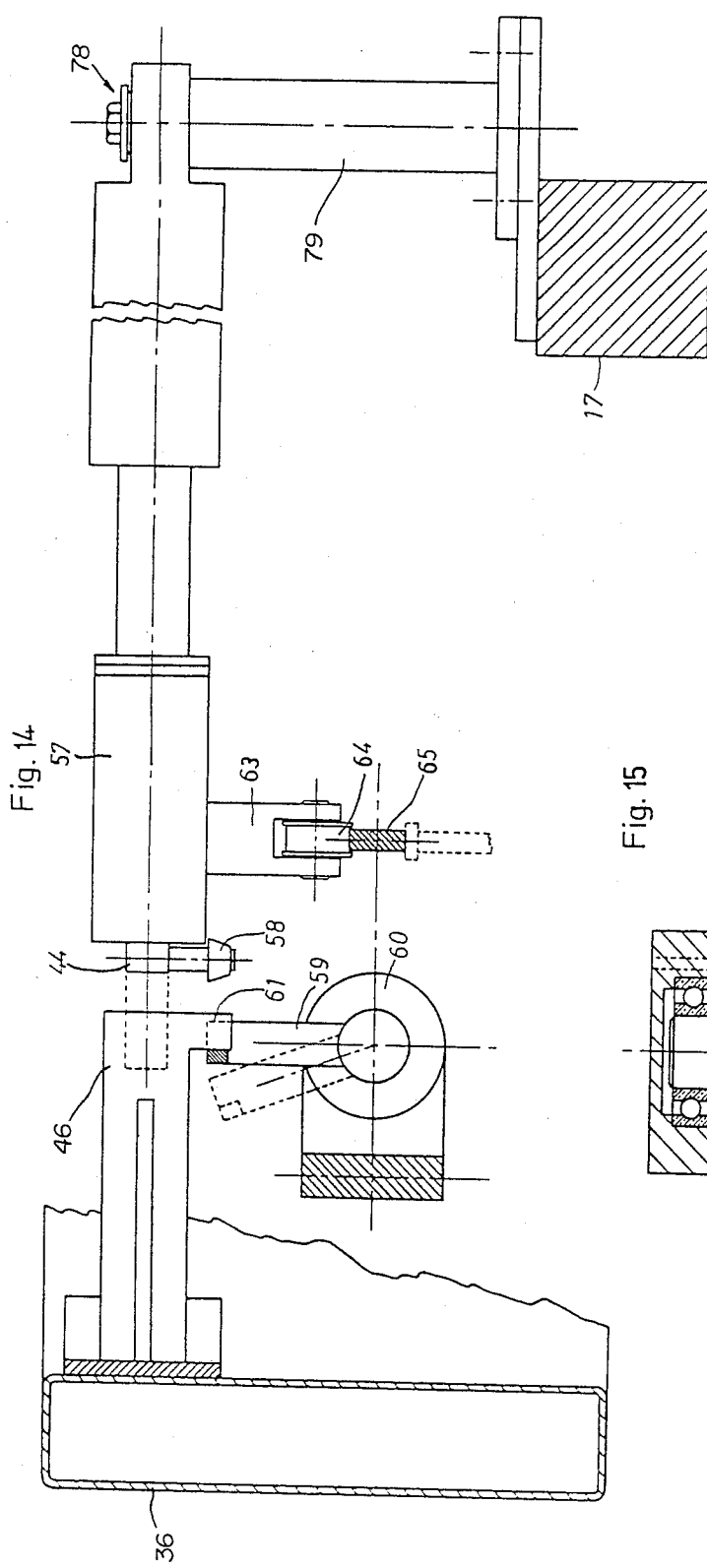
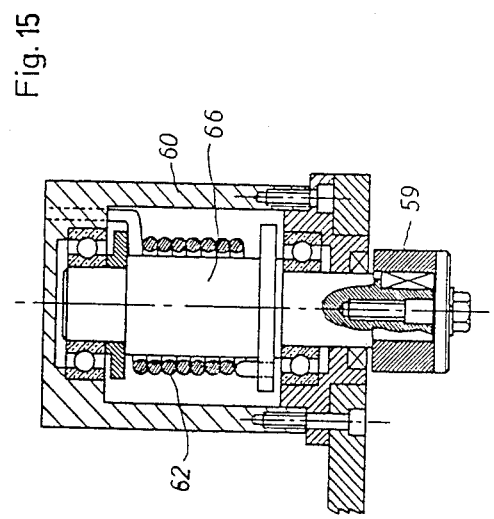

4,791,705

MACHINE FOR MEAT TREATMENT AND MACERATION, WITH AUTOMATIC LOADING AND UNLOADING

BACKGROUND OF THE INVENTION

1. Field Of The Invention

The present invention relates to a machine for meat maceration and treatment which includes automatic loading and unloading, more particularly to a machine for the preparation of different meat products in the pork butchering industry and for all those applications where a previous maceration and treatment is required, with or without product temperature regulation, whatever its origin or source might be.

2. Description Of The Prior Art

Previously-known machines of this type, with a rotating drum for meat treatment, are shown in Spanish Pat. Nos. 406,947 for a machine for meat treatment and maceration by a system, which proposes the possibility of alternative stages of vacuum and pressure in the treatment chamber, 435,711 for improvements in machines to macerate and treat meat concerning the integration in the chamber wall of some means for temperature regulation, and 545,242 for improvements in a machine to treat and macerate meats by a pressure system in which are disclosed some improvements in receptacles and the inner wall of the drum, as well as some security means associate with tight closing of the door to generate a depressurizing of the chamber simultaneously with its opening.

Other previous machines, though less pertinent to the machine of this invention by the fact that they do not use for treatment a basic unit referred to as a drum, but in fact include the possibility of automatic loading and unloading, are disclosed in the Italian Pat. Nos. 1,036,702 for a mixing device for even diffusion of brine in the meat, and 1,068,610 for improvements in mixing devices for even diffusion of brine in the meat of Mr. Luigi Menozzi, and 1,028,808 for method and devices for meat treatment, in particular ham meat of the company H. J. LANGEN E. ZONEN B.V., which is also the holder of the Spanish Pat. No. 502,024 for a device to handle pieces of meat, for example to knead or mix the. Such patents disclose some tanks that are driven around a treatment unit, which has available another half-tank, fit to be coupled with a tight closing at the hood inlet forming a single receptacle which is made rotating or revolving around a spin axis associated with the half-tank linked to the treatment unit. Because of the coupling features of the two half-tanks, it is not feasible to foresee in these systems the realization inside the working chamber of significant pressure cycles, as in the treatment drum of the machine of the invention, because the stress generated would not be compatible with stable association of the half-tanks. Neither are there foreseen in these machines open receptacles with the possibility of an alternate striking or soft massage corresponding to one sense of rotation or the other.

BRIEF SUMMARY OF THE INVENTION

The object of this invention is to provide an improved machine of the type referred to in the above patents capable of automatic loading and unloading, operating during its working cycle in equivalent working conditions, and offering all the services mentioned above, at the user's will.

The machine of the invention includes a drum rotatable on its symmetry axis, with a loading hood inlet opening, against which a closing door acts, the access opening in the drum being coaxial with the rotational axis, and defined in one of the ends of the internal chamber of the drum, driving and rolling elements monitoring and supporting the drum for rotation, a support and operating means for the door that can rotate on its center and is assembled on a tiltable frame articulated at one of its ends to a fixed support structure. In this way, though the drum rotates on the symmetry axis passing through the center of its loading and unloading hood inlet, during the treatment cycle of the meat mass the drum can be tilted about a horizontal axis in a vertical direction to adopt different angular positions, rotating or not, due to a tilting of the frame on which the drum is assembled, with correlating lifting or lowering of the drum end opposite to the loading and unloading hood inlet, which remains at a practically constant level, the lifting or lowering of the end of the tilting frame being in correlation with meat loading, treatment, and unloading operations.

The drum is positioned with its back remote from its tilting axis and at a lowest level for the loading stage, movable to a horizontal position of its spin axis during the treatment stage and tilted with the back end at a higher level for the unloading stage.

Mechanical lifting means are arranged on the machine to catch, lift and roll over, or tilt, containers, loaded with the material to be treated, open at the top, which are successively presented in a proper orientation to the lifting means by a rigid carriage structure, with intermittent advance, that supports them and from which they can be separated and returned after successive lifting and tilting for emptying into a loading hopper located in a raised position near and facing the drum loading hood inlet. The hopper is also tiltable between positions near to and away from the hood inlet for receiving and dumping meat loads inside the drum when the drum support frame tilts to position its hood inlet orientated to receive the meat load poured from the hopper. The hopper is then separated from the drum hood inlet to allow closing and reopening later for emptying treated meat that will be directly poured from the drum to the related unloading container, from which it was taken, through proper tilt of the drum with rotation thereof to assist emptying.

Prior to the lifting of a container for the drum, the unit has available a means to control and identify the contents of the container and its features in accordance with a computer program for its joint operation, including the intermittent advance of the carriage structure of the separable containers and direct return to the carriage structure of meat loads already treated.

The machine has available also in the area for drum unloading means to control the weight of the material transferred to the containers in order to stop the unloading when they receive a pre-established quantity of meat.

The door of the meat treatment drum is assembled on a support structure independent of the drum, but connected with the tilt frame, and has means for positioning and separating it with respect to the drum loading and unloading hood inlet, and means allowing its rotation on its center with respect to support structure. The door is arranged for fitting and locking in tight closing in the drum hood inlet in any position of rotation so that pressure inside the drum of a significant magnitude may be sustained without the risk of opening or loss of pressure in the chamber.

The machine uses a large drum which is filled to about 40% capacity and has a two-way rotating movement around its geometric spin axis and is horizontally oriented during the treatment phase. The drum has integrated on its wall a means allowing temperature regulation of the meat mass during the maceration stage, as well as other means to provide alternative stages of vacuum and air or oxygen under pressure, of a variable duration, inside the chamber, the vacuum and subsequent pressure states very effectively assisting in produce maceration. The drum is mechanically coupled with a motor to provide a drive torque in one direction or the other in the different periods of the treatment cycle.

On the inner wall of the drum a plurality of spaced blades define a series of elongated receptacles, open at the top, parallel, and orientated as generatrices lengthwise of the entire drum, and delimited by the ends of the chamber. The receptacles are filled with meat, the blades acting as spoons in one direction of rotation for lifting and dropping some of the meat on the rest of the meat mass occupying the recess from the upper part of the drum, while in the opposite direction of rotation, the meat slides on inclined surfaces of the blades forming the bottom of receptacles, thereby being softly massaged. This means that during the treatment hard striking action on the meat is combined with soft massage, all under chamber temperature and pressure conditions (vacuum and pressure cycles) controlled as desired.

BRIEF DESCRIPTION OF THE DRAWINGS

The invention will now be described in detail with reference to the accompanying drawings, wherein:

FIG. 2 is an elevational schematic view of the unit showing the treatment drum and its support frame, and in dotted lines the loading and unloading positions;

FIG. 3 is a front elevational view of FIG. 2 from the left and partly in cross section;

FIG. 7b is a top plan view, partly in cross section, of the locking lever system of FIG. 7a;

FIG. 10 is an elevational view of a container used to carry the meat as shown in FIGS. 1 and 9;

FIG. 11 is a side elevational view of FIG. 10;

FIG. 14 is a partially cross-sectional view showing the device used to advance step-by-step the annular structure bearing the containers loaded with the product to be treated; and FIG. 15 is a detail cross-sectional view of the resilient device used to block the annular carriage structure in the stop periods between advances.

DETAILED DESCRIPTION

Figure 1:
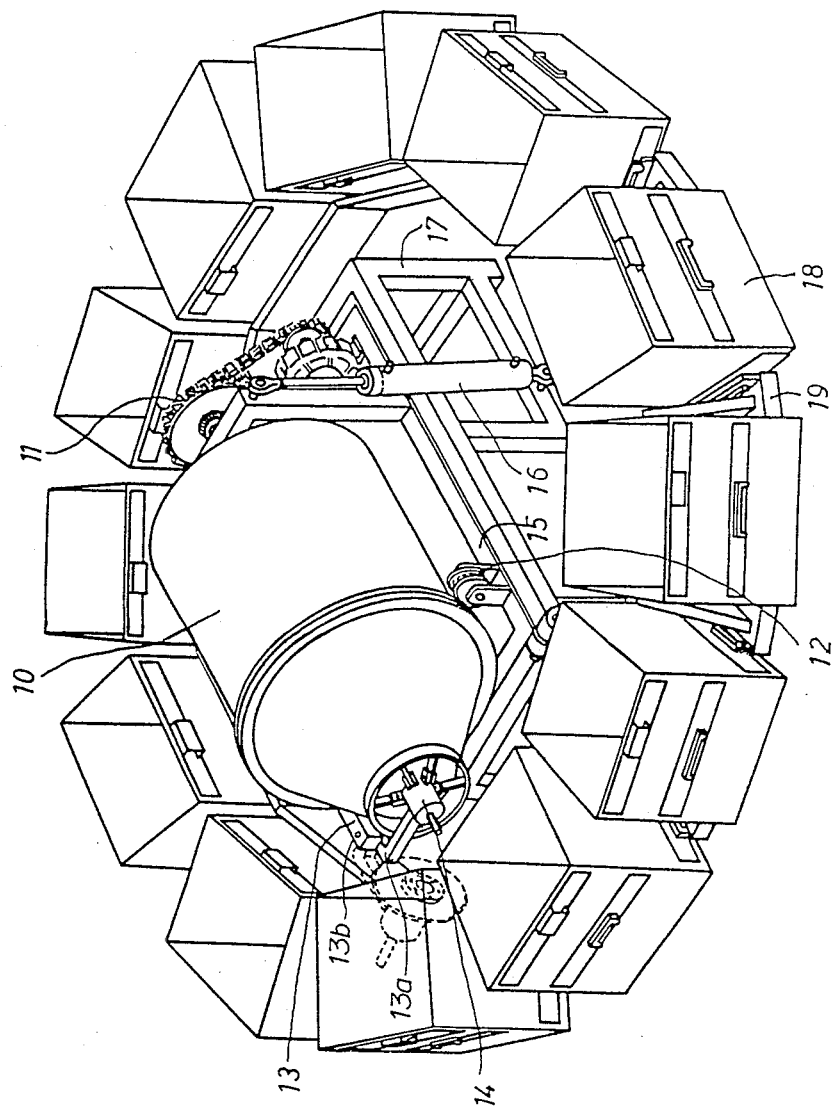
FIG. 1 is a perspective view of the machine unit showing the meat treating drum, lifting means, and containers which move around the drum.

Referring to FIG. 1, we can see that the machine includes a drum to treat the meat which is rotatable and provided with driving means 11 and rolling means 12 and near which is a support 13 bearing a closing door 14. All these elements are assembled on a frame 15 for tilting by means of hydraulic cylinders 16 and articulated at its front end as shown to a fixed support structure 17, supporting drum 10 over the level of the hood inlet of a series of containers 18 arranged on an annular bearing structure 19 in such a way that they describe a path or circuit. Containers 18 in one of their positions along that path are disposed directly below the drum hood inlet. As seen in this figure and FIG. 2, drum 10 rotates around a symmetry axis passing through the center of its hood inlet and in the working position is horizontal, but moves between its loading and unloading stages having positions with negative and positive slopes, respectively.

In FIG. 2, one can clearly see how frame 15 is articulated to the front part of the fixed structure 17 for raising and lowering drum 10, driving means 11, rolling drum support means 12 constituted by wheels having a V-groove in which rides an annular element or collar 20 mounted on the outer wall of drum 10, the closing lid 14 which is separated from the hood inlet of drum 10 during loading and unloading stages, and the unloading stage by lifting the back part of the drum.

FIG. 3 shows more clearly the rolling drum support in the form of a collar 20 and supporting wheels 12 mounted on the transverse front beam of frame 15 for tilting with respect to the fixed structure 17.

Figure 5A:
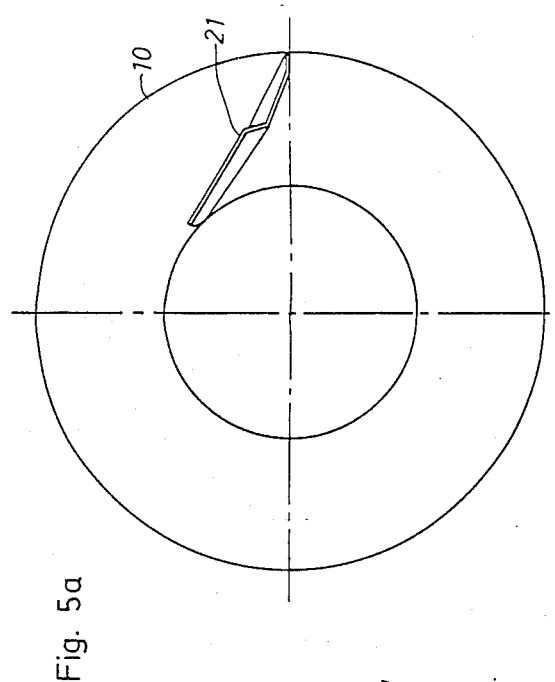
FIG. 5a is a schematic cross-sectional view taken along line Va—Va of FIG. 4.
Figure 5B:
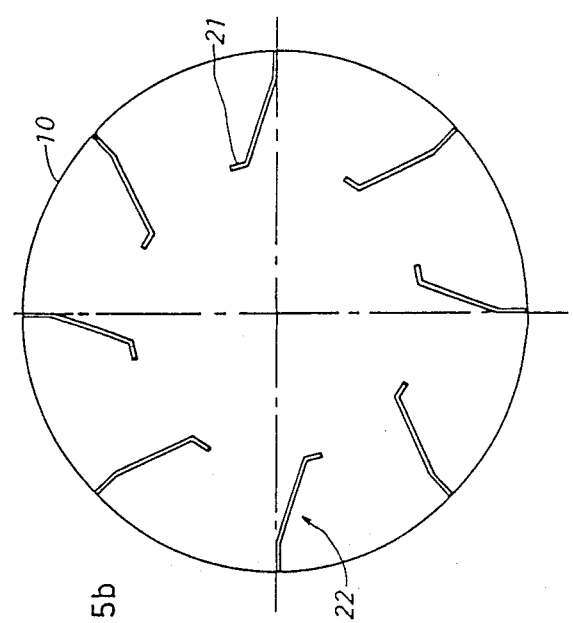
FIG. 5b is a schematic cross-sectional view taken along line Vb—Vb of FIG. 4.
Figure 4:
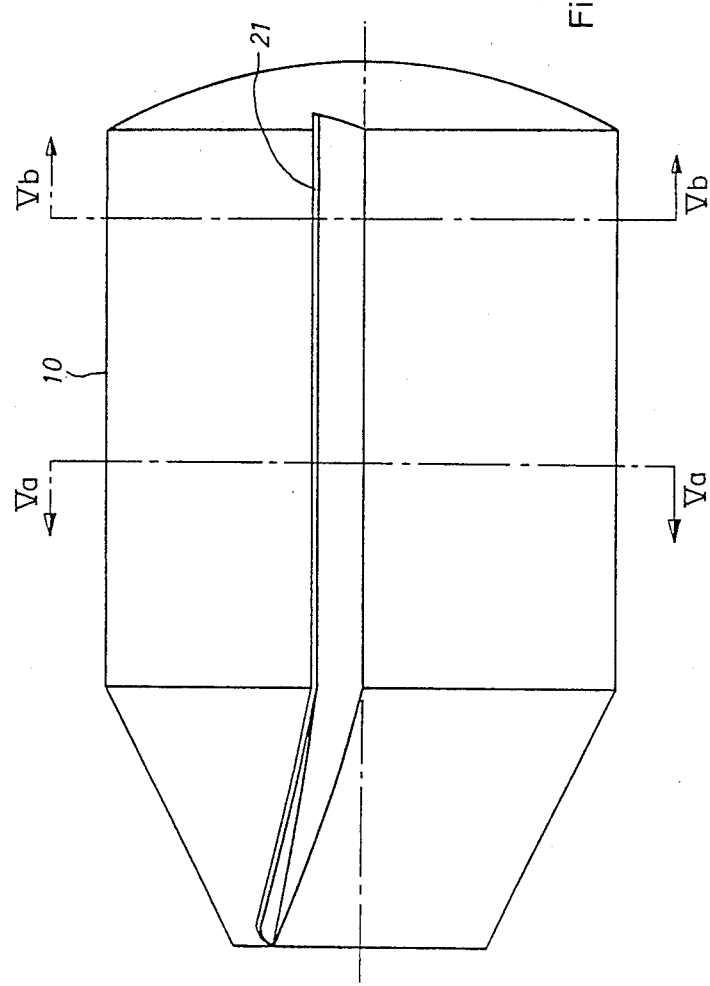
FIG. 4 is a schematic view of the inside of the treatment drum showing one of the blades on its inner wall.

In FIGS. 4 and 5a one of the nearly generatrix blades 21 can be seen extending from and defining along the drum inner wall a series of receptacles 22, that appear more clearly in FIG. 5b, in order to obtain a hard striking action on the meat mass during one of the drum-rotating phases, but provide a soft massage when the meat slides over the blades 21 in the other drum rotating phase.

Figure 6:
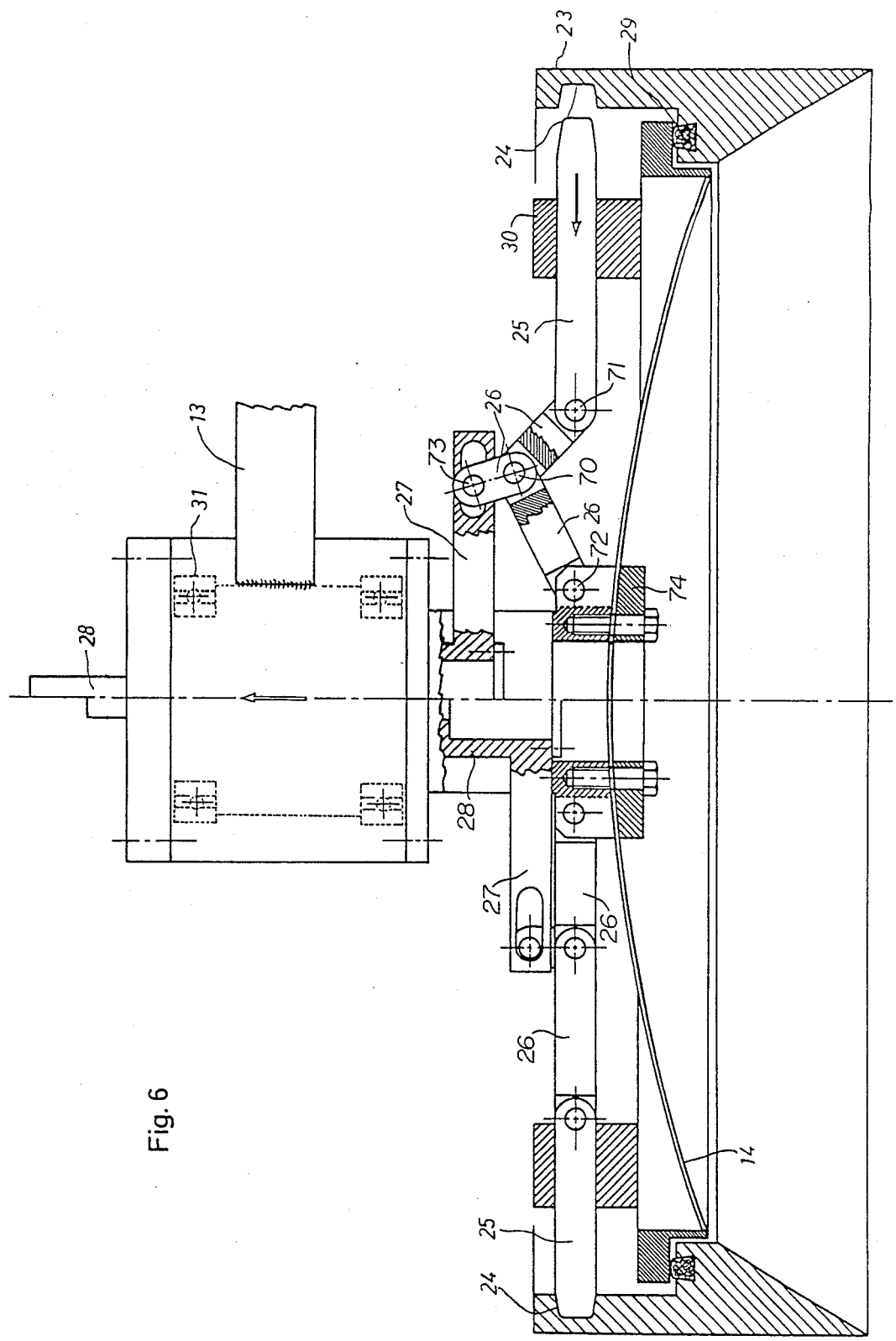
FIG. 6 is a transverse cross-sectional view showing the closing door fitted to the drum hood inlet.
Figure 9:
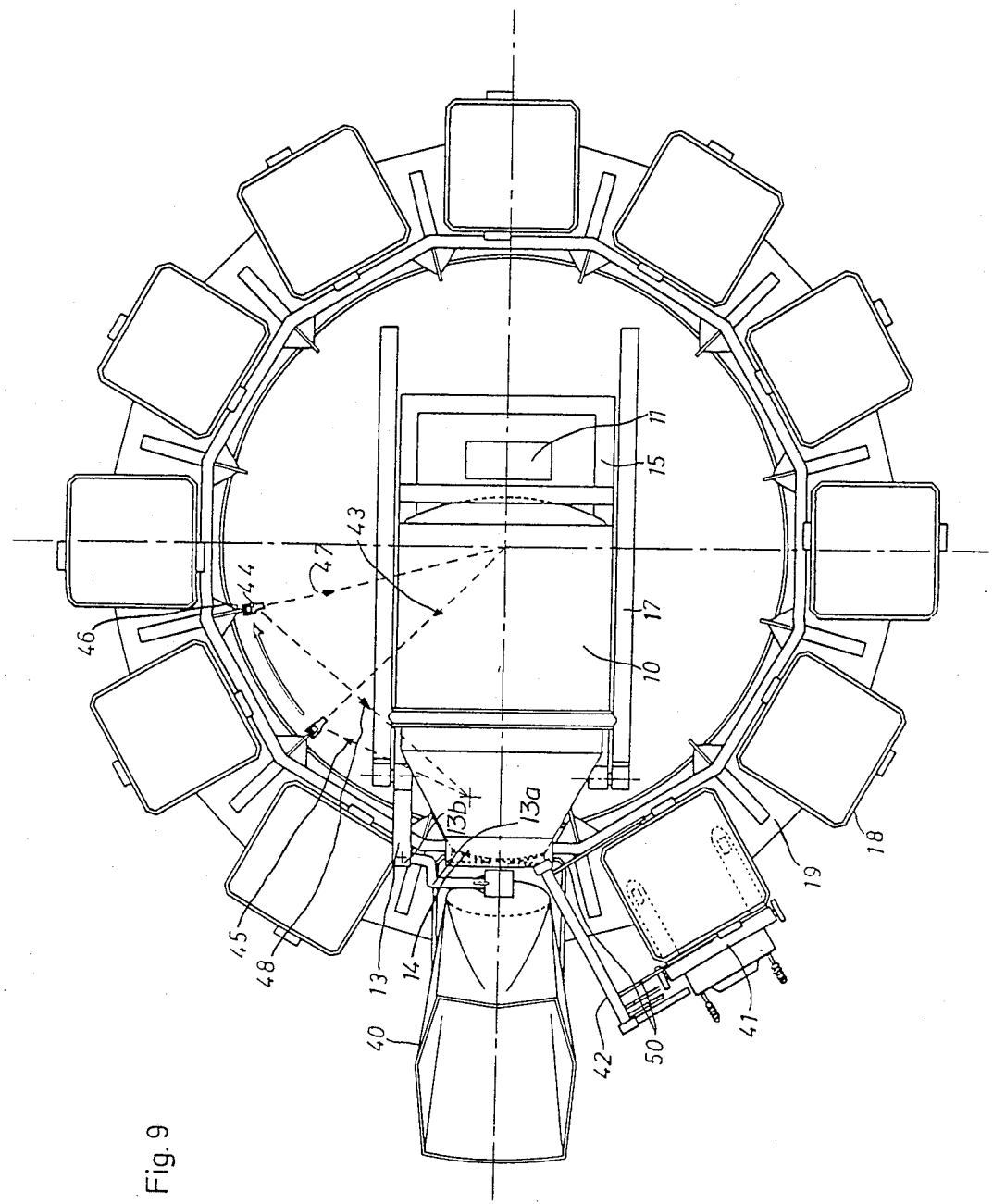
FIG. 9 is a top plan view, partly schematic, of the machine of FIG. 1 showing the integrated elements and a typical working operation and cycle.

In FIG. 6 is shown the door 14 for tight closing of drum 10, in the position where it is coupled to its hood inlet 23, which in its inner wall has an annular recess 24 in which finger-like appendages 25 are inserted. Locking fingers 25 are connected to an articulated lever system having links 26 pivotally connected together at 70, to the inner end of fingers 25 at 71, to the central part 74 of door 14 and to a series of radial blades 27 linked to a stem 28 operated axially in advance and return by conventional means. As can be clearly seen in this figure, the operation of stem 28 determines the expansion and contraction of fingers 25, which when interlocked in recess 24 effectively lock door 14 in the closed position. In order to best understand the stated operation, FIG. 6 shows in its right half the retraction position of fingers 25 with stem 28 axially with-drawn and in its left half the expanded position corresponding to the locked state of the door with stem 28 moved axially toward door 14. There is also a seal joint element mounted in the seating plane of hood inlet 23 of drum 10 engageable with the rim of door 14 for sealing the drum, and guide parts 30 for guiding fingers 25 are evenly distributed at equiangular intervals on the surface of the external wall of door 14. In this figure one can also observe the bearings 31 located to allow stem 28 to operate independently from support 13 and allow rotation of door 14 jointly with drum 10 during the closing stage. As seen in FIGS. 1 and 9, door 14 is supported on arm 13a pivoted at 13b on support 13.

Figure 7A:
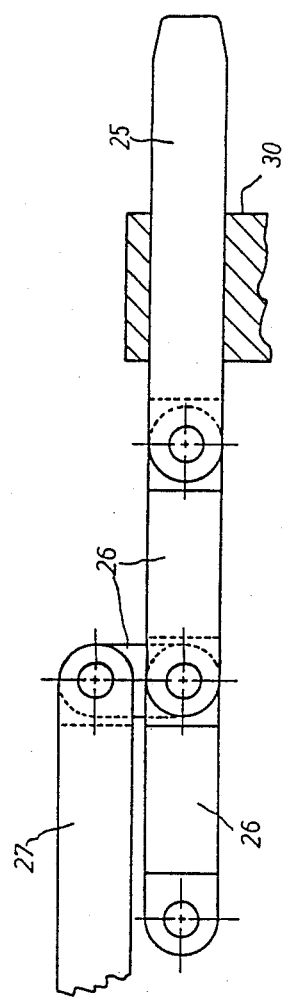
FIG. 7a is an enlarged view of part of one of the locking lever systems shown in FIG. 6.
Figure 7B:
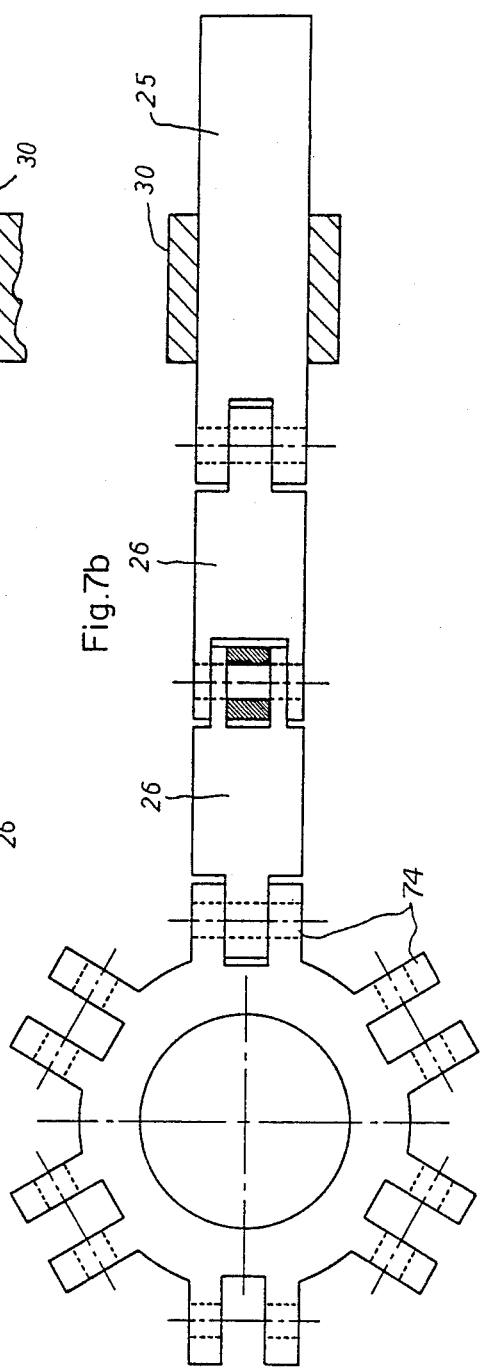

In FIGS. 7a and 7b one can see the form of radial blades 27 and the interrelation thereof with the lever system articulated by the interconnected links 26 that are also connected to fingers 25 guided by guides 30.

Figure 8:
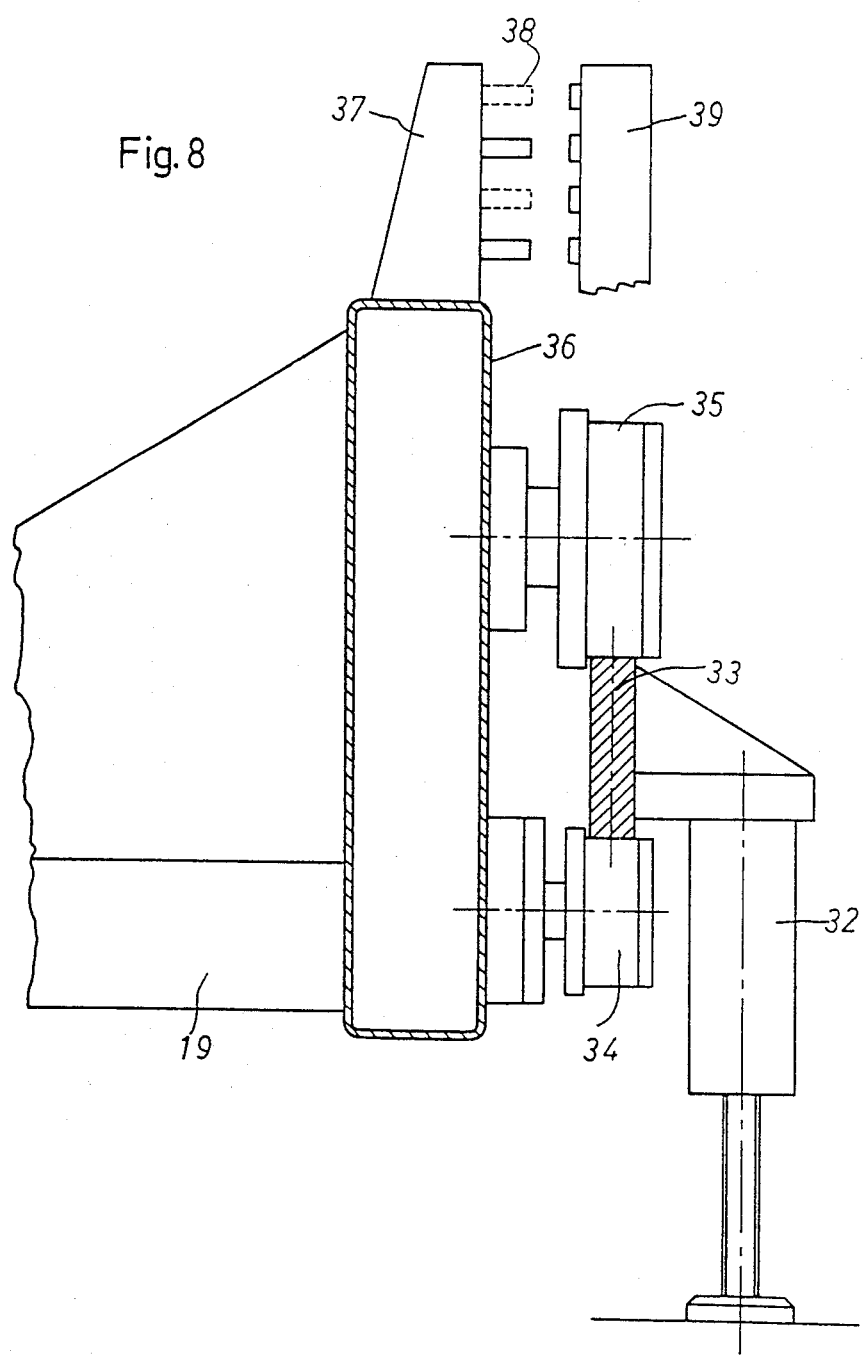
FIG. 8 is a vertical cross-sectional view showing the support and an annular structure for bearing the containers which carry the meat to be treated, and means of control and identification of contents of the container.

In FIG. 8 is shown a support or foot 32 supporting at the top an annular rail 33 which is embraced by pairs of rolling elements 34 and 35 linked by their axes to the wall 36 of the supporting structure 19 of the containers 18.

At the upper part of wall 36 a profile 37 is mounted bearing a plurality of pivots 38 that can vary in number and position, so that when passing in front of a proximity detector 39 the detector can identify, according to a binary code, for example, a particular container as well as the characteristics of its load, as explained above.

The top plan view in FIG. 9 shows practically all the elements integrated into the machine of the invention, i.e. rotating drum 10 assembled on frame 15 for tilting relative to support structure 17. Ahead of hood inlet 23 of drum 10 operated in rotation by some means 11, a hopper 40 is provided for loading that can be positioned near the hood inlet 23 of drum 10 in the loading stage of the treatment chamber, moving away after completing this operation. Near hopper 40 a structure 42 is provided for lifting and rolling, or tipping over, containers 18 that were transferred to this position by a lifter 41 similar to a conventional type. As can be seen, containers 18 on annular structure 19 carrying them advance stepby-step and after their contents are transferred to hopper 40, and from there to drum 10, they are located at once ahead of drum 10, awaiting the finish of the treatment whereafter the load is newly-poured inside the container, at which stage it is simultaneously weighed, restarting a cycle that will have a longer or shorter duration as a function of the characteristics of the material to be treated. In this same figure indicated with a series of dotted lines are the means to haul the annular structure 19 carrying containers 18 and for its advance step-by-step, including two hydraulic cylinders, or equivalent means, that operate along the trajectories 43 and 45. The first of such hydraulic cylinders has a fork part at the top which, when such cylinder is activated and expands outwardly, catches the profile of an appendage 46 on the all 36 (see FIG. 14) of annular structure 19. Once this mechanical link is established, the second hydraulic cylinder operates on the side of the first hydraulic cylinder along the trajectory 45 and moves at a determined angle as a unit the annular structure 29 (see in the figure the initial and final positions, with an advance angle well-defined). After such advance, the first cylinder is retracted along the trajectory 47 and the fork 44 does not retain anymore the profile 46. At this moment the second cylinder is retracted along trajectory 48 re-positioning the unit to the starting point, prepared for a new operation. Means are detailed in FIGS. 14 and 15 for blocking from such moment the movement of the structure 19.

FIGS. 10 and 11 show the containers 18 on which tubular profiles 49 stand out on two opposite sides near to the hood inlet for catching by the lifting and rolling-over means, including forks 50 for tilting (see FIGS. 9 and 13), that are introduced inside profiles 49, allowing a proper handling of containers 18. Near to the base each container 18 and at about half its height are profiles 51 and 52 respectively, also provided in pairs on opposite side parts, that assist in correct positioning of the containers on the supporting structure 19 and in handling during operation.

Figure 12:
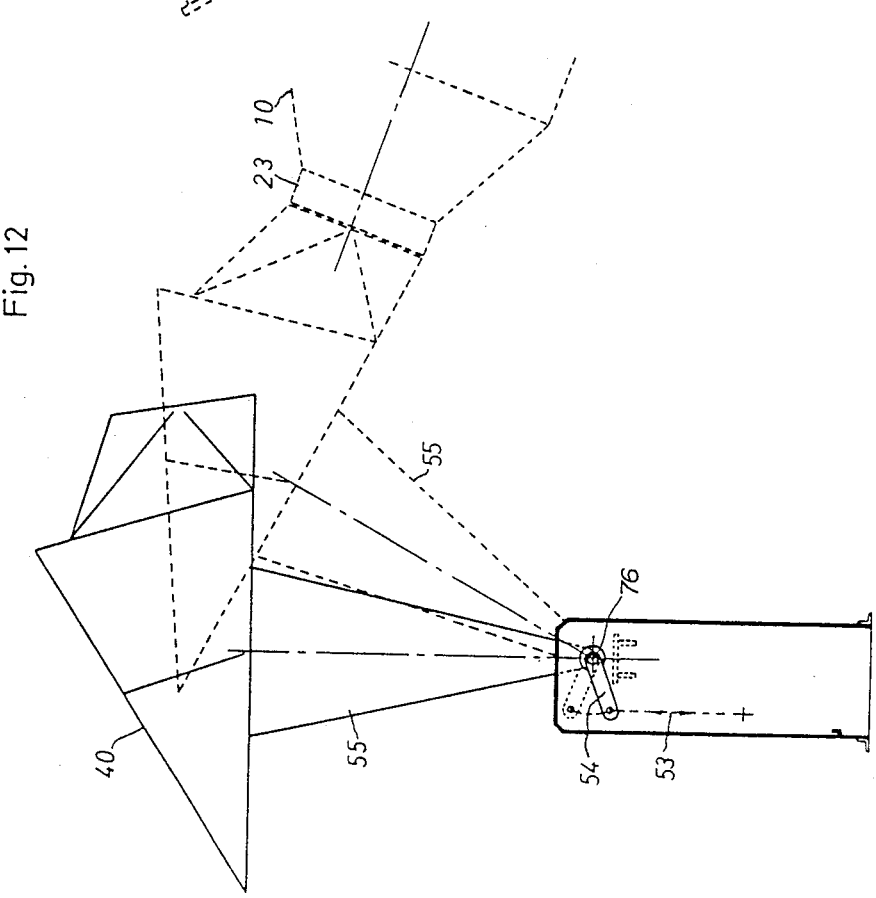
FIG. 12 is a schematic view showing the loading hopper and in dotted lines its operative position.

FIG. 12 shows a possible operation by means of a cylinder operating along the vertical trajectory 53 which interacts with a connecting rod 54 linked to an axle 76 having an arm 55 perpendicular to and locked together with connecting rod 54, on whose upper end part the hopper 40 section is joined. Hopper 40, depending on the position of the operating cylinder, will be moved near to or away from hood inlet 23 of drum 10, so that, as already mentioned for the loading stage, it adopts as well an inclined orientation as shown in dotted lines in this figure.

Figure 13:
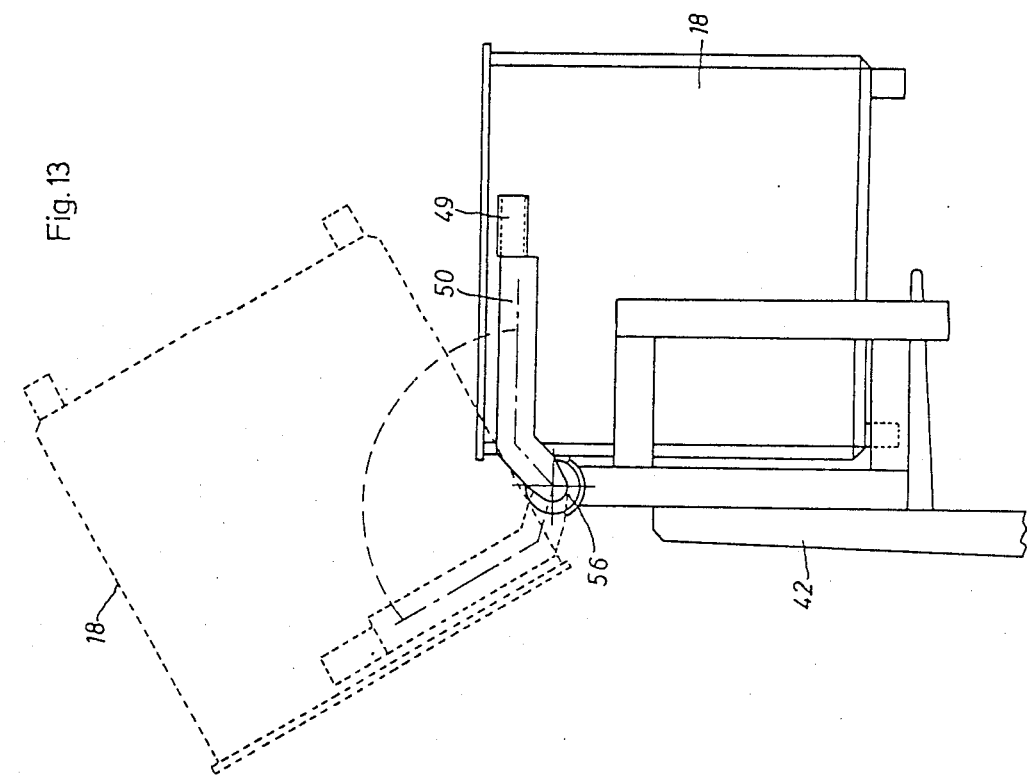
FIG. 13 is a schematic view showing the tipping device used with the lifter shown in FIG. 9 to transfer the load from the containers to the hopper.

In FIG. 13, the device 42 for lifting and tipping-over the containers 18 on the hopper is shown and includes basically a fork 50, whose arms are introduced inside the profiles 49 by an approach movement and side displacement from lifting unit 41. Fork 50 is linked to an axle 56 to which is transferred a rotation torque by a convenient mechanical system producing tipping rotating of the receptacle unit which then pours its contents into the cavity of hopper 40 when the latter is correctly positioned as shown in dashed lines at the right side of FIG. 12.

FIG. 14 shows the hydraulic cylinder 57 that operates along the trajectories 43 and 47 (retraction), according to the explanation of FIG. 9. The stem of cylinder 57 has fork 44 at its end, which in turn has an appendage 58 vertically oriented downward, so that in its operation when fork 44 embraces profile 46 linked to wall 36, it also moves aside a lever 59 resiliently loaded by a part 60 on which lever 59 is mounted to block the structure 19 supported containers 18, when engaging in a recess 61 defined in the lower part of profile 46.

FIG. 14 also shows that cylinder 57 has an appendage 63 projecting from its body and having a rolling element 64 on its end for supporting cylinder 57 on a horizontal arcuate rail 65 to allow angular displacement of hydraulic cylinder 57 about its pivotal connection 78 at its inner end on a post member 79 mounted on support structure 17 when the second cylinder operates along trajectories 45 and 48, thereby determining properly the angular displacements of structure 19.

FIG. 15 shows details of unit 60 for blocking structure 19 in a rest position including a spring 62 in the hollow interior of cylinder 60 which is twist-loaded around rotatable axle 66 on which lever 59 is mounted externally of cylinder 60.

Although the invention has been described in the preferred embodiment manner so that it can be understood and practiced by a technician in the art, variations in detail that do not alter the essential features of the invention may be made with in the scope of the appended claims, and its application to products other than meat products, supplied in large pieces, as for example cheese or similar products for softening or kneading, are contemplated.

I claim:

1. An apparatus for meat treatment and maceration with automatic loading and unloading comprising:
   a large hollow drum;
   a loading and unloading aperture at one end of said drum;
   means integrated on the wall of the drum for regulating temperature of meat contained in the drum;
   means to produce alternate stages of variable duration of vacuum and pressure inside said drum;
   a fixed support structure;
   a tilting frame having one end pivotally mounted on said support structure and an opposite end rotatable supporting a rear end of said drum on an axis of rotation thereof coinciding with the symmetrical axis of said drum;
   roller support means mounted on said tilting frame near said one end thereof for supporting said drum on the outer surface thereof for rotation about said axis of rotation;
   means for tilting said tilting frame about the pivotal end thereof for raising and lowering the rear end of said drum between a lowered position for loading said drum through the aperture therein, a fully raised position for unloading said drum through the aperture thereof, and an intermediate treating position for treating meat within said drum;
   drive means for rotating said drum about said axis of rotation;
   a door engageable over said aperture for closing and opening said aperture;
   door support arm means pivotally mounted on said tilting frame;
   door support mean connected to said door support arm means and rotatably connected to said door for allowing rotation of said door with respect to said support arm and tilting frame about said axis of rotation of said drum;
   means to move said door into and from the closed position in a hermetically sealed relationship against said aperture;
   door locking means mounted on said door for locking said door in said hermetically sealed relationship against said aperture;
   hopper means engageable with said aperture when said door is in the open position for feeding meat into said drum when said drum is in the loading position;
   hopper support means supporting said hopper for movement between a nonloading position spaced from said drum and a loading position wherein said hopper is positioned adjacent said drum when said drum is in the loading position for feeding meat in said hopper into said drum;
   an annular container support structure surrounding said drum and being rotatable in a substantially horizontal plane around said drum;
   a plurality of containers supported in spaced relationship on said annular structure, each container having an open top;
   means for rotating said annular structure with said containers thereon in intermittent steps to position one of said containers in a container-emptying position for emptying meat in said container into said hopper when said hopper is in the loading position, and for positioning said empty container into a next succeeding position wherein the open top thereof is under said aperture in said drum when said drum is in said unloading position with said door in said open position; and
   lifting and tilting means engageable with each container for raising and tilting said container for emptying meat therein into said hopper when in the loading position and returning said container to said annular structure after emptying thereof.

2. The apparatus as claimed in claim 1 and further comprising:
   computer control means operatively connected to said annular support structure for intermittently advancing said annular support structure in step-by-step manner; and
   means on said annular support structure and cooperating means separately supported in adjacent proximity to said annular support structure for controlling and identifying the contents and characteristics of the load contained in each container before and after the treatment of said load in said drum.

3. The apparatus as claimed in claim 1 wherein said door locking means comprises;
   a stem coaxially extending from the outer side of said door through said door support means rotatably therein;
   a plurality of actuating blades radially extending from said stem in circumferential spaced relationship therearound;
   a plurality of locking fingers slidably mounted on the outer side of said door for radial movement relative thereto;
   a hub member located on said door radially inwardly with respect to said locking fingers;
   a plurality of linking levers interconnecting said hub and a respective locking finger and actuator blade, said actuator being axially movable with respect to said stem so that axial movement thereof moves said locking finger radially between a radial inner unlocking position and a radial outer locking position; and
   an annular locking groove in the end of said drum adjacent said aperture for receiving the radially outer ends of said locking fingers when in the locking position for clamping said cover onto said drum at said aperture.

4. The apparatus as claimed in claim 1 and further comprising:
   means for detecting the weight of each container when in said refilling position, and for stopping further unloading of said drum into said container at a predetermined detected weight of said container.

5. The apparatus as claimed in claim 3 wherein said linking levers comprise for each locking finger:
   a first link having one end pivotally connected to said hub member;
   a second link having one end pivotally connected to the radially inner end of a respective locking finger;
   a third link having one end pivotally connected to a respective actuator blade; and
   means for pivotally interconnecting the other ends of said first, second and third links.

6. The apparatus as claimed in claim 1 wherein said means for rotating said annular support structure comprises:
   first fluid-operated piston and cylinder means having a first cylinder with a radially inner end pivotally supported on said fixed support structure substantially at the center of said annular support structure;

a substantially horizontal arcuate rail under said first cylinder near the radially outer end thereof;

a roller member rotatably mounted on said first cylinder and in rolling engagement on said arcuate rail;

first piston rod means extending radially outwardly from said first cylinder;

releasable coupling means on the radially outer end of said first piston rod and a plurality of cooperating circumferentially spaced coupling means on said annular support structure for engagement with said releasable coupling means when said first piston rod is radially extended;

second fluid-operated piston and cylinder means having a second cylinder pivotally mounted at one end thereof on said fixed support structure; and a second piston rod extending from the other end of said second cylinder and having an outer end pivotally connected to said first cylinder;

so that when said coupling means are engaged, actuation of said second cylinder to move said second piston outwardly rotates said annular support structure from a starting position of rotation a predetermined angular distance to a second position of rotation after which actuation of said first cylinder to retract said first piston rod disengages said releasable coupling means, and actuation of said second cylinder to retract said second piston rod returns said first cylinder and piston means to alignment with said starting position, whereafter actuation of said first cylinder to extend said first piston rod reengages said coupling means.

7. The apparatus as claimed in claim 6 wherein said predetermined angular distance is determined by a limit stop means comprising:

a fixed spring mounted stop lever means;

a stop member on each cooperating coupling means on said annular support structure engageable with said stop lever means when said annular support structure is in the starting position; and a stop release member on said releasable coupling means engageable with said stop lever means for moving said stop lever means against the action of the spring thereof out of engagement with a respective stop member when said first piston rod is radially extended into the outer position thereof in said starting position.

* * * * *